United States Patent
Sun et al.

(10) Patent No.: US 11,972,382 B2
(45) Date of Patent: Apr. 30, 2024

(54) ROOT CAUSE IDENTIFICATION AND ANALYSIS

(71) Applicant: International Business Machines Corporation, Armonk, NY (US)

(72) Inventors: Hongtan Sun, Armonk, NY (US);
Muhammed Fatih Bulut, New York, NY (US); Pritpal S. Arora, Bangalore (IN); Klaus Koenig, Essenheim (DE); Maja Vukovic, New York, NY (US); Naga A. Ayachitula, Elmsford, NY (US)

( * ) Notice: Subject to any disclaimer, the term of this patent is extended or adjusted under 35 U.S.C. 154(b) by 556 days.

(21) Appl. No.: 16/282,565

(22) Filed: Feb. 22, 2019

(65) Prior Publication Data
US 2020/0272973 A1  Aug. 27, 2020

(51) Int. Cl.
*G06Q 10/0639*   (2023.01)
*G06N 20/00*   (2019.01)

(52) U.S. Cl.
CPC ....... *G06Q 10/06393* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,693,982 B2 | 4/2010 | Goldszmidt et al. | |
| 8,112,305 B2 | 2/2012 | Shimizu | |
| 9,348,815 B1 * | 5/2016 | Estes | G06F 40/30 |
| 10,270,668 B1 * | 4/2019 | Thompson | H04L 41/5009 |
| 2007/0263541 A1 | 11/2007 | Cobb et al. | |
| 2009/0183030 A1 * | 7/2009 | Bethke | G06F 11/079 714/37 |
| 2010/0023362 A1 | 1/2010 | Nguyen et al. | |
| 2011/0179313 A1 | 7/2011 | MacDonald et al. | |
| 2013/0132108 A1 | 5/2013 | Solilov et al. | |
| 2014/0365638 A1 | 12/2014 | Shah et al. | |
| 2015/0280969 A1 * | 10/2015 | Gates | H04L 41/0631 714/37 |
| 2016/0103888 A1 | 4/2016 | Fletcher et al. | |

(Continued)

FOREIGN PATENT DOCUMENTS

WO   2018009733   1/2018

OTHER PUBLICATIONS

Fu, Song and Xu, C., "Quantifying Temporal and Spatial Correlation of Failure Events for Proactive Management," 26th IEEE International Symposium on Reliable Distributed Systems (SRDS 2007), Beijing, 2007, pp. 175-184.

*Primary Examiner* — Deirdre D Hatcher

(57) ABSTRACT

Embodiments relate to monitoring an information technology (IT) environment having a plurality of domains through key performance indicator (KPI) data. In response to detection of a technical health problem, a first KPI related to the problem is identified. A root cause analysis is performed on the identified KPI generating a knowledge graph. A second KPI related to the first KPI is identified through the discovery of a correlation between the two identified KPIs. A diagnosis is generated for the technical health problem within the IT environment based on the discovered hidden correlation between the first KPI and second KPI. The generated diagnosis includes the root cause of the technical health issue.

25 Claims, 8 Drawing Sheets

(56) References Cited

U.S. PATENT DOCUMENTS

| | | |
|---|---|---|
| 2016/0105338 A1 | 4/2016 | Fletcher |
| 2016/0210556 A1* | 7/2016 | Ben Simhon ............ G06N 3/08 |
| 2016/0328641 A1 | 11/2016 | AlSaud et al. |
| 2017/0075749 A1* | 3/2017 | Ambichl ............. G06F 11/0748 |
| 2017/0076206 A1* | 3/2017 | Lastras-Montano ......................... G06F 16/3344 |
| 2017/0124502 A1 | 5/2017 | Brew et al. |
| 2017/0141945 A1 | 5/2017 | Giammaria |
| 2017/0272960 A1 | 9/2017 | Li et al. |
| 2018/0322954 A1* | 11/2018 | Ding ...................... G16H 70/60 |
| 2019/0007290 A1* | 1/2019 | He ...................... H04L 43/0823 |
| 2019/0165988 A1* | 5/2019 | Wang ................. H04L 41/0631 |
| 2019/0318288 A1* | 10/2019 | Noskov ................. G06F 11/079 |
| 2020/0103878 A1* | 4/2020 | SayyarRodsari ............................ G05B 19/41885 |
| 2020/0371857 A1* | 11/2020 | Guha ..................... G06N 20/00 |

\* cited by examiner

ROOT CAUSE IDENTIFICATION AND ANALYSIS

BACKGROUND

The present embodiments relate to derivation of a correlation between key performance indicators in an information technology (IT) environment. More specifically, the embodiments relate to leveraging the derived correlation to identify a root cause of an associated technical health issue.

In order to maintain or secure mission-critical systems, businesses often rely on monitoring systems that can help predict, detect and/or diagnose problems. However, when incidents occur in a complex production environment, it takes a tremendous amount of effort to investigate and determine the root causes of those incidents based on information provided by the monitoring system in use. For instance, a subject matter expert might need to analyze data related to metrics involved in an incident over a time period, and for any given anomaly a large amount of effort can go into building up the pattern of metrics that helps an administrator understand and address the situation at hand.

Managing business performance by estimating key performance indicators (KPIs) or similar indices is known. For example, current business index processing systems find the appropriate capital structure for a certain capital outlay based on the probability distribution proportional to the profit from the money invested. Business management systems, as scenarios, use a combination of databases that daily manage business index values and results from past simulations. Such systems assume an abundance of financial data and historical simulation results that can be directly used in calculations of estimated objectives. Other systems execute business simulations from the input of business indices or values that are the elements of business indices. Still other systems can, when required, calculate business indices based on the latest performance results and planning information. However, these systems do not address an inter-KPI analysis for establishing a relationship across KPIs or indices.

SUMMARY

The embodiments include a system, computer program product, and method for maintenance and management of an infrastructure utilizing one or more statistical correlations.

In one aspect, a system is provided for use with an evaluator to monitor an information technology (IT) environment having a plurality of domains. The system includes a processing unit operatively coupled to memory, and an evaluator operatively coupled to the evaluator to support the evaluator. The evaluator identifies a first key performance indicator (KPI) related to a technical health issue in the IT environment, and performs a root cause analysis (RCA) directed at the first identified KPI. Using the RCA, the evaluator generates a knowledge graph from a knowledge base corresponding to the first KPI to discover a hidden correlation among two or more KPIs. With the discovered correlation, the evaluator identifies a second KPI that is determined to be related to the first KPI. The evaluator generates a diagnosis of the technical health issue within the IT environment based on the discovered hidden correlation between the first and second KPIs. The root cause of the technical health issue is included in the generated diagnosis.

In another aspect, a computer program product is provided to derive KPIs. The computer program product includes a computer readable storage device with embodied program code that is configured to be executed by a processing unit. More specifically, the program code is provided to identify a first KPI related to a technical health issue. Program code performs a RCA directed at the first KPI, and using the RCA, generates a knowledge graph from a knowledge base corresponding to the first KPI. The program code discovers a hidden correlation among two or more KPIs. With the discovered correlation, program code identifies a second KPI related to the first KPI. The program code generates a diagnosis of the technical health issue within the IT environment based on the discovered hidden correlation between the first and second KPIs. The root cause of the technical health issue is included in the generated diagnosis.

In yet another aspect, a method is provided for monitoring an IT environment having a plurality of domains. In response to a technical health issue, a first KPI related to the technical health issue is identified. A RCA is performed on the first KPI to generate a knowledge graph from a knowledge base corresponding to the first KPI. A hidden correlation among two or more KPIs is discovered, with the hidden correlation identifying a second KPI related to the first KPI. A diagnosis of the technical health issue within the IT environment based on the discovered hidden correlation between the first and second KPIs is generated. The root cause of the technical health issue is included in the generated diagnosis.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, the system, the method, and the computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

An Information Technology (IT) infrastructure refers to composite hardware, software, network resources and services required for operation and management of an enterprise IT environment. A standard IT infrastructure consists of servers, storage, security and compliance, applications and middleware, and hardware and software in support of one or more networks. It is understood that aspects and components of the IT infrastructure may be assigned KPIs, which reflects a measurement used to identify and quantify performance of the individual components. In one embodiment, KPIs are created or assigned to the components to quantitatively and qualitatively apply a measurable objective.

It is understood that in the IT infrastructure performance of one component may affect or direct the performance of another components. For example, a problem in the network can affect one or more applications or middleware. Based on this example, a solution may be available to address the network problem, but the solution may not necessarily benefit or enhance performance of the affected application(s) or middleware. There is a need to diagnose the underlying problem of all affected components, with an encompassing and holistic solution. As described in detail below, the solution is directed at discovering a root cause and a corresponding correlation among related KPIs, with the root cause evidencing the diagnosed underlying problem.

Figure 1:
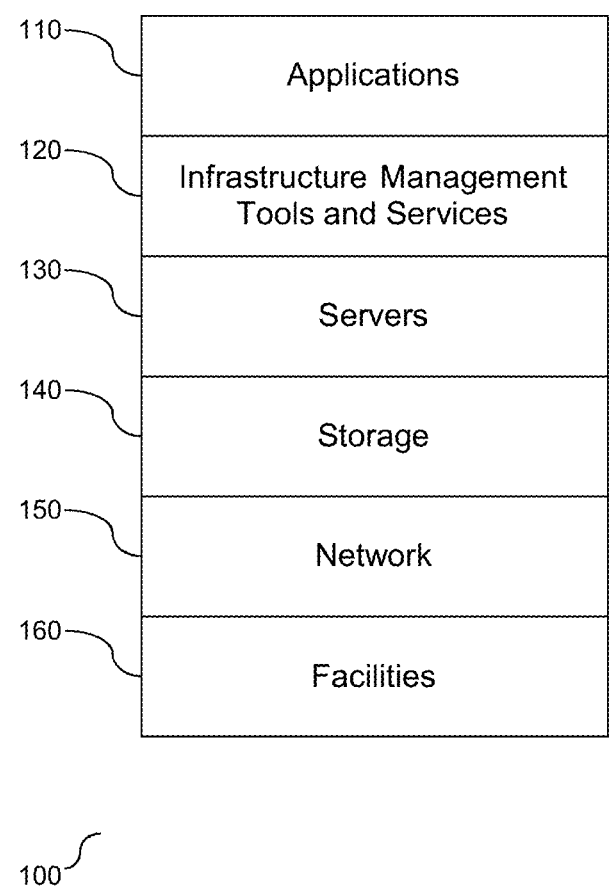
FIG. 1 depicts a schematic diagram to illustrate an example of layers of an IT infrastructure.

Referring to FIG. 1, a schematic diagram (100) is provided to illustrate an example of layers of an IT infrastructure. In this example, there are six layers, including applications (110), infrastructure management tools and services (120), servers (130), storage (140), network (150), and facilities (160). The applications (110) are directed at the software tools utilized by the hardware components in the corresponding IT environment. The infrastructure management tools and services (120) are directed at dynamic host configuration protocol (DHCP) and domain name system (DNS) to efficiently manage all elements of the infrastructure. The server layer (130) consists of physical and/or virtual servers. The storage layer (140) represents physical and/or virtual storage devices and components. The network layer (150) represents physical tools and elements in support of networking, including but not limited to routers, switches, firewalls, and load balancers. The facilities layer (160) represents the physical data center facility that houses IT equipment and includes power, cooling, and security components. Accordingly, the example shown herein as an abstract representation of an IT infrastructure and the corresponding layers.

Figure 2:
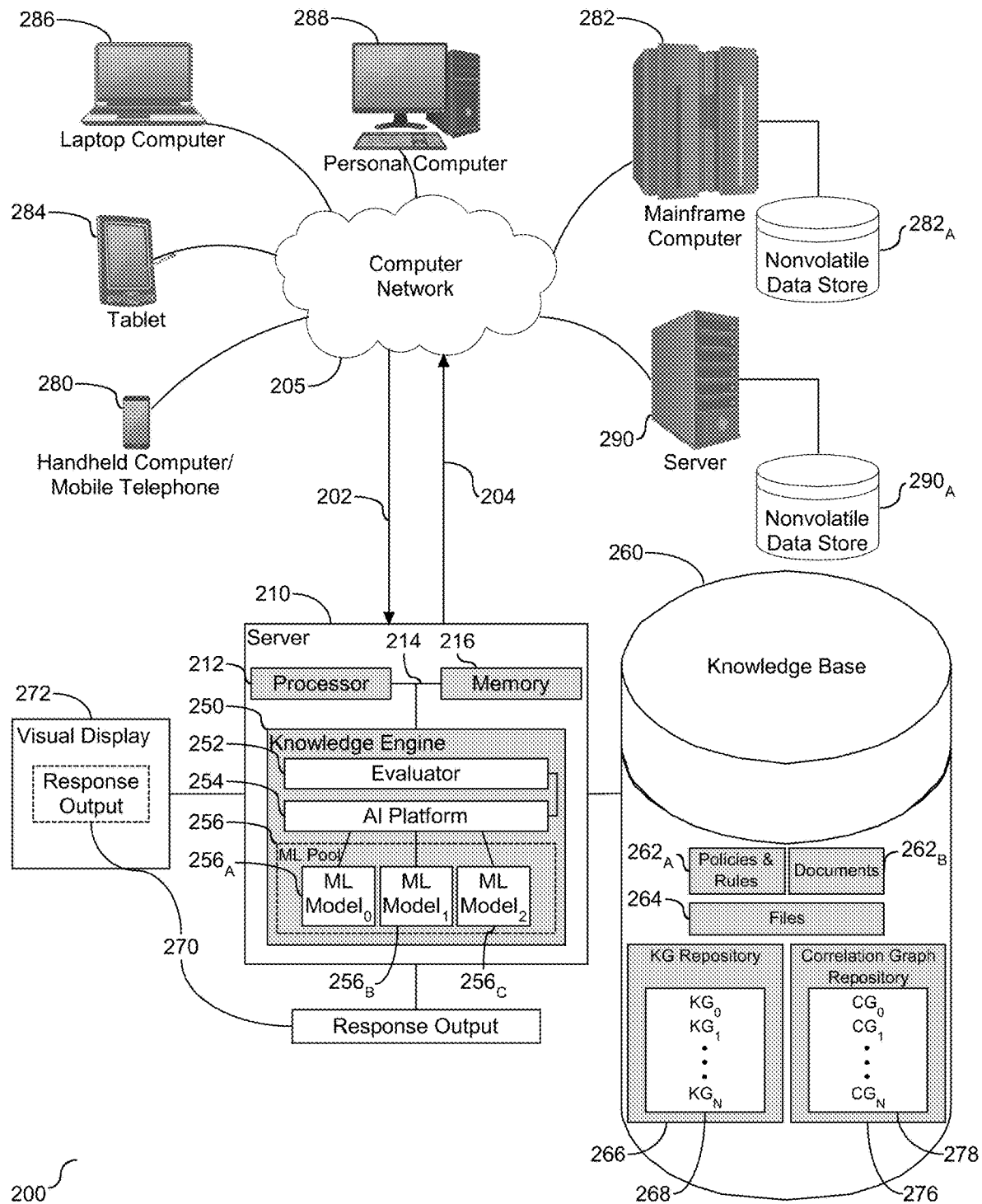
FIG. 2 depicts a system diagram illustrating an artificial intelligence platform computing system.

Referring to FIG. 2, a schematic diagram of a computing platform (200) to support and manage the IT infrastructure is depicted. As shown, a server (210) is provided in communication with a plurality of computing devices (280), (282), (284), (286), and (288) across a network connection (205). The server (210) is configured with a processing unit (212) in communication with memory (216) across a bus (214). The server (210) is shown with a knowledge engine (250) having tools in the form of an evaluator (252) operatively coupled to an artificial intelligence (AI) platform (254) to support machine learning (ML) over the network (205) from one or more of the computing devices (280), (282), (284), (286) and (288). More specifically, the computing devices (280), (282), (284), (286), and (288) communicate with each other and with other devices or components via one or more wired and/or wireless data communication links, where each communication link may comprise one or more of wires, routers, switches, transmitters, receivers, or the like. In this networked arrangement, the server (210) and the network connection (205) enable communication detection, recognition, and resolution. Other embodiments of the server (210) may be used with components, systems, sub-systems, and/or devices other than those that are depicted herein.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificially intelligent computer systems, natural language systems (such as the IBM Watson® artificially intelligent computer system or other natural language interrogatory answering systems) process natural language based on system acquired knowledge. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. More specifically, ML is the application of AI through creation of neural networks that can demonstrate learning behavior by performing tasks that are not explicitly programmed. Deep learning is a type of ML in which systems can accomplish complex tasks by using multiple layers of choices based on output of a previous layer, creating increasingly smarter and more abstract conclusions.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly.

The knowledge engine (250) is shown herein configured with tools to an operatively coupled IT infrastructure across the network (205), and more specifically, to diagnose one or more technical health issues and a corresponding root cause of the diagnosed issue. The knowledge engine (250) may receive input from the network (205) and selectively evaluate health issues and support diagnosis of an operatively coupled IT infrastructure. In one embodiment, the knowledge engine leverages the knowledge base, e.g. data source, (260) in support of the diagnosis or diagnosing process. As shown, the data source (260) is configured with logically grouped policies and rules ($262_A$). In one embodiment, the data source (260) may be configured with other or additional sources of input, and as such, the sources of input shown and described herein should not be considered limiting. Similarly, in one embodiment, the data source (260) includes structured, semi-structured, and/or unstructured content in a plurality of documents ($262_B$) that are contained in one or more databases or corpus. The various computing devices (280), (282), (284), (286), and (288) in communication with the network (205) may include access points for the logically grouped documents ($262_B$). Some of the computing devices may include devices for a database storing the corpus of data as the body of information used by the knowledge engine (250) to generate response output (270), and to communicate the response output to a corresponding network device operatively coupled to the server (210) or one or more of the computing devices (280)-(288) across network connection (204).

The network (205) may include local network connections and remote connections in various embodiments, such that the knowledge engine (250) may operate in environments of any size, including local and global, e.g. the Internet. Additionally, the knowledge engine (250) serves as a front-end system that can make available a variety of knowledge extracted from or represented in network accessible sources and/or structured data sources. In this manner, some processes populate the knowledge engine (250), with the knowledge engine (250) also including input interfaces to receive requests and respond accordingly.

As shown, rules and corresponding policies are logically grouped ($262_A$) for use as part of the corpus (260) of data with the knowledge engine (250). The corpus (260) may include structured and unstructured source of data, represented herein as files (264) for use by the knowledge engine (250). The knowledge engine (250), via a network connection or an internet connection to the network (205), is configured with an evaluator (252) to identify infrastructure concerns, such as technical health issues, including evaluation and/or diagnosis of the concerns, and identification of a root cause of the concern(s). The evaluator (252) functions to identify a KPI directed at performance concerns in the infrastructure, such as a corresponding technical health concern. The evaluator (252) identifies a classification corresponding to the identified KPI and performs a root cause analysis (RCA) for the identified KPI and corresponding classification. As part of the diagnosis process, the evaluator (252) generates a knowledge graph (KG) (268) from a knowledge base (260), e.g. the logically grouped documents ($262_B$) corresponding to the identified KPI and corresponding classification. Accordingly, the KG is generated from the logically grouped documents ($262_B$).

The generated KG (268) is stored in a KG repository (266) of the knowledge base (260) so that it may be utilized at a later point-in-time, and in one embodiment, the evaluator (252) may leverage an existing KG (268), such as $KG_N$ in the KG repository (266) stored in the knowledge base (260) from a prior evaluation. A plurality of KGs (268) shown herein as $KG_0$, $KG_1$, ... $KG_N$ are shown in the KG Repository (266) of the knowledge base (260), although the quantity should not be considered limiting. As shown herein, the knowledge base (260) is populated with policies and rules ($262_A$), documents ($262_B$), and files (264). In one embodiment, the evaluator (252) leverages a corresponding policy or rule in the knowledge base as a source for leveraging an existing KG or generating a KG. Accordingly, in the example shown herein, the knowledge base (260) includes policies and rules ($262_A$), documents ($262_B$), and files (264), and corresponding knowledge graphs (266) to support the functionality of the evaluator (252).

One of the goals of the tools shown herein is to discover a hidden or non-apparent correlation between the identified KPI and a second KPI. It is understood in the art that some correlations between KPIs in the infrastructure may be apparent or obvious, but others require research and analysis to discover correlations that are not easily visible, apparent, or predictable, but are nevertheless present.

Figure 3:
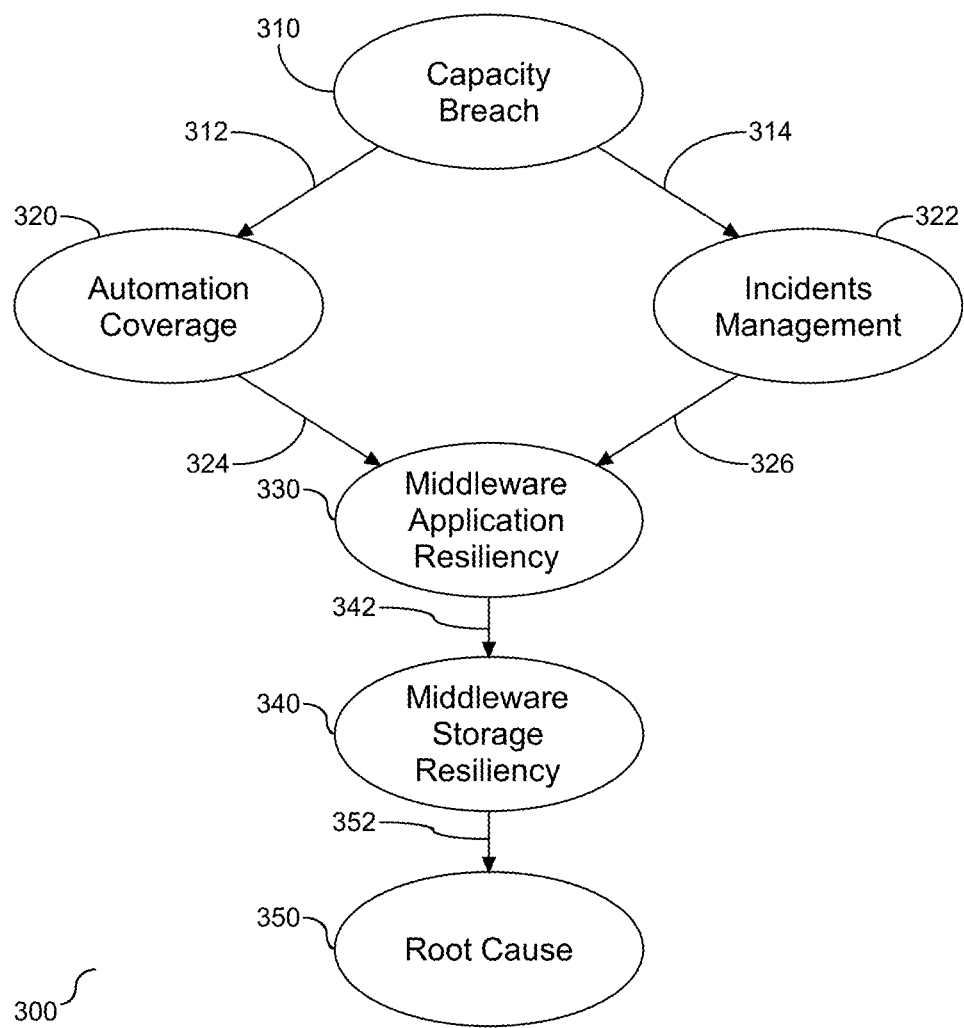
FIG. 3 depicts a flow diagram to illustrate an example RCA corresponding to a KPI classification.

Referring to FIG. 3, a flow diagram (300) is provided to illustrate an example RCA corresponding to a KPI classification. The RCA shown herein is an example of one of the KGs (268) stored in the KG repository (266). As shown, the classification corresponding to the identified KPI is directed at a capacity breach (310). In this example, the causes of capacity breach may be related to incidents corresponding to file system usage, e.g. disk space. Two classes are shown related to the causes of the capacity breach, including automation coverage (320) and incidents management (322). The capacity breach (310) and the classes of causes (320) and (322) are shown herein as nodes. The relationships of the classes of causes (320) and (322) to the capacity breach (310) are shown herein as edges (312) and (314), respectively. Edge (312) demonstrates the relationship of automation coverage (320) to the capacity breach (310), and edge (314) demonstrates the relationship of incidents management (322) to the capacity breach (310). It is further shown that there is one common class of a cause related to classes (320) and (322), which common class is shown and represented herein as middleware application resiliency (330), with the relationships demonstrated by edges (324) and (326), respectively. The middleware application resiliency (330) is further demonstrated as related to middleware storage resiliency (340) by edge (342). It is further demonstrated in this example that the root cause (350) is represented by an automatic log rotation is not in place (350), which is demonstrated herein to be related to the cause (340) by edge (352) to be the root cause (350) of the capacity breach (310), which in one embodiment functions as a classification of a second KPI. Accordingly, the RCA analysis shown herein is an example of a KG created to identify the root cause of the identified capacity breach in the file system usage.

Returning to FIG. 2, the RCA analysis conducted by the evaluator (252) utilizes an originating KPI concern and identifies a corresponding classification for the KPI concern. The evaluator (252) either leverages an existing KG (266) or creates a KG with the KPI classification, and conducts the RCA analysis. As demonstrated in the example RCA analysis of FIG. 3, the root cause analysis identifies a classification of the root cause, also referred to herein as the second KPI classification. This second KPI classification is also referred to as a hidden KPI classification as it is identified by the RCA analysis, and is otherwise not apparent. Using the second KPI classification, the evaluator (252) identifies a corresponding KPI, e.g. second KPI, for the hidden classification. More specifically, the performance data for the root cause is ascertained. Accordingly, the second KPI is discovered from the classification of the root cause identified in the RCA.

Using the originating KPI, e.g. first KPI, and the discovered KPI, e.g. the second KPI, the evaluator (252) conducts an assessment to ascertain a correlation between the first and second KPI, and more specifically to ascertain strength of the correlation. In one embodiment, the evaluation of the strength of the correlation includes the evaluator (252) performing a statistical evaluation of the first and second KPIs. It is understood that if the strength is determined to be a weak correlation, then the root cause has a weak relationship to the classification of the first KPI. Similarly, it is understood that if the strength is determined to be a strong correlation, then the root cause is likely a factor in the diagnosis of the health issue in the infrastructure. The evaluator (252) leverages the strength of the relationship to generate a diagnosis of the technical health issue corresponding to the first KPI, and conveys the root cause with the generated diagnosis.

The correlation between the first and second KPIs may be demonstrated in a graph, with the KPIs represented as nodes, and the correlation represented as an edge between the nodes. As shown herein, a correlation graph repository (276) is provided in the knowledge base (260) to store correlation graph(s) (CG) (278). In the example shown in FIG. 3, the evaluation is limited to two KPIs, e.g. the first and second KPIs. However, in one embodiment, the evaluation may be more complex and may involve a plurality of KPIs. Similarly, it is understood that the correlation graph(s) (278) may be amended, and as such subject to expansion to illustrate expanded correlations.

The correlation between KPIs discovered by the evaluator (252) is based on the RCA and the identified root cause. It is understood that the conduct of the evaluator may be correct, or in one embodiment incorrect. As such, the root cause identification is subject to verification by a subject matter expert (SME). In one embodiment, the evaluator (252) reflects the identified root cause and corresponding KPI value, e.g. the second KPI, with actual state data. For example, in one embodiment, the KPI value corresponding to the root cause should be commensurate with the KPI value of the first KPI.

As further shown, the knowledge engine (250) is configured with AI platform (254) shown herein with one or more machine learning models, including $Model_0$ ($256_A$), $Model_1$ ($256_B$), and $Model_2$ ($256_C$), also referred to herein collectively as a pool (256) of ML models. Although only three models are shown, the quantity should not be considered limiting. The models are configured to assess and compute a correlation score from two or more KPIs. For example, in one embodiment, the AI platform (254) conducts a time series analysis to identify the correlation between at least two KPIs. The AI platform (254) trains one of the ML models ($256_A$)-($256_C$) to discover and compute a correlation score from a series of KPI scores over time, e.g. time series analysis, with the AI platform (254) performing a verification of the discovered correlation. In one embodiment, the AI platform (254) identifies or creates a corresponding ML model to reflect the discovered correlation and stores the corresponding ML model, e.g. $Model_0$ ($256_A$), $Model_1$ ($256_B$), and $Model_2$ ($256_C$), in the pool (256). Similarly, in one embodiment, the AI platform (254) selects one of the ML models from the pool (256) of existing models, e.g. $256_A$-$256_C$. The selected or generated ML model is configured to interface with the corresponding AI platform (254) and the evaluator (252) to support correlation and causation. The AI platform (254) reflects the discovered correlation in one or more of the correlation graph(s) (278) stored in the correlation graph repository (276) of the knowledge base (260).

The ML models ($256_A$), ($256_B$), and ($256_C$) may be classified based on characteristics of the infrastructure or customers of the infrastructure. For example, in one embodiment, one or more of the ML models may be classified based on the customer or customer characteristics to capture customer similarities. For example, the size of the customer, e.g. small, medium, large, etc., the business characteristics of the customer, e.g. financial, healthcare, etc. Similarly, in one embodiment, the ML models may be classified based on an infrastructure characteristic. By classifying the ML models, the AI platform may identify and implement an existing ML model for one customer that was previously utilized with another customer with an overlapping characteristic. This sharing or leveraging of the ML model(s) is an avenue to obtain KPI correlation(s) from time series analysis. In addition, this sharing or leveraging of the ML model captures cross-customer knowledge for discovering performance indicator correlation and corresponding diagnosis of otherwise hidden correlations.

The AI platform (254) leverages the discovered correlation(s) and dynamically amends a corresponding KG (268) stored in the knowledge graph repository (266) of the knowledge base (260). In addition, a relationship between the ML model and the corresponding KG (268) is created, such as storing an identifier, e.g. metadata, of the ML model with the KG (268), and/or storing an identifier of the KG graph (268) with the ML model. This relationship may be leveraged by the AI platform (254) to identify the ML model and/or the KG graph for a future KPI evaluation. In one embodiment, changes or amendment to the KG graph (268) are detected by the AI platform (254), and the detection is communicated to the corresponding or identified ML model. The ML model evaluates and identifies the detected changes, and incorporates the detected changes into the model. Accordingly, a relationship between the ML model and the KG is created and dynamically maintained.

The network infrastructure is dynamic. It is understood that as the infrastructure is subject to change, one or more policies and corresponding rules may be subject to change. New policies and rules may be learned. As shown, the artificial intelligence platform (254) enables and support use of ML with respect to policies and policy management, and other infrastructure changes. In one embodiment, the AI platform (254) encapsulates or otherwise reflects the identified changes in one or more corresponding ML models in the ML pool (256) to encapsulate the identified changes in a corresponding ML algorithm. The ML model(s) function to dynamically learn and employ new policies as the characteristics of the network, network devices, and security protocols are subject to change. In one embodiment, the AI platform (254) discovers and analyzes patterns and changes in the infrastructure and/or the customer(s), and reflects the discovered changes in one or more of the ML models. In addition, the amended ML model may reflect such changes in a related KG (268). The infrastructure and corresponding components are dynamic. The infrastructure customers and customer behaviors are also dynamic. The AI platform (254) supports the dynamic characteristics and associated elasticity by dynamically reflecting detected or identified changes into one or more ML models and one or more related KGs.

Performance indicator assessment(s) received across the network (205) may be processed by a server (210), for example IBM Watson® server, and the corresponding knowledge engine (250) tools, shown herein as the evaluator (252) and the artificial intelligence (AI) platform (254). As shown herein, the knowledge engine (250) together with the embedded tools (252) and (254) performs an analysis on key performance indicators. The function of the analysis is to perform a RCA and discover a hidden correlation using the identified root cause. The AI platform (254) supports and enables time series analysis and leveraging commonality among infrastructure characteristics and customers to bring efficiency and accuracy in the correlation identification and evaluation.

The evaluator (252) and the AI platform (254), hereinafter referred to collectively as tools, are shown as being embodied in or integrated within the knowledge engine (250) of the server (210). The tools may be implemented in a separate computing system (e.g., 290), or in one embodiment a system or systems, can they be implemented in two or more connected across network (205) to the server (210). Wherever embodied, the tools function to dynamically monitor a corresponding infrastructure, and health and integrity of one or more infrastructure components or layers respect to the monitoring performance indicators.

Types of devices and corresponding systems that can utilize the knowledge engine (250) range from small handheld devices, such as handheld computer/mobile telephone (280) to large mainframe systems, such as mainframe computer (282). Examples of handheld computer (280) include personal digital assistants (PDAs), personal entertainment devices, such as MP4 players, portable televisions, and compact disc players. Other examples of information handling systems include pen, or tablet computer (284), laptop, or notebook computer (286), personal computer system (288), and server (290). As shown, the various devices and systems can be networked together using computer network (205). Types of computer network (205) that can be used to interconnect the various devices and systems include Local Area Networks (LANs), Wireless Local Area Networks (WLANs), the Internet, the Public Switched Telephone Network (PSTN), other wireless networks, and any other network topology that can be used to interconnect the devices and systems. Many of the devices and systems include nonvolatile data stores, such as hard drives and/or nonvolatile memory. Some of the devices and systems may use separate nonvolatile data stores (e.g., server (290) utilizes nonvolatile data store ($290_A$), and mainframe computer (282) utilizes nonvolatile data store ($282_A$)). The nonvolatile data store ($282_A$) can be a component that is external to the various devices and systems or can be internal to one of the devices and systems.

Figure 4:
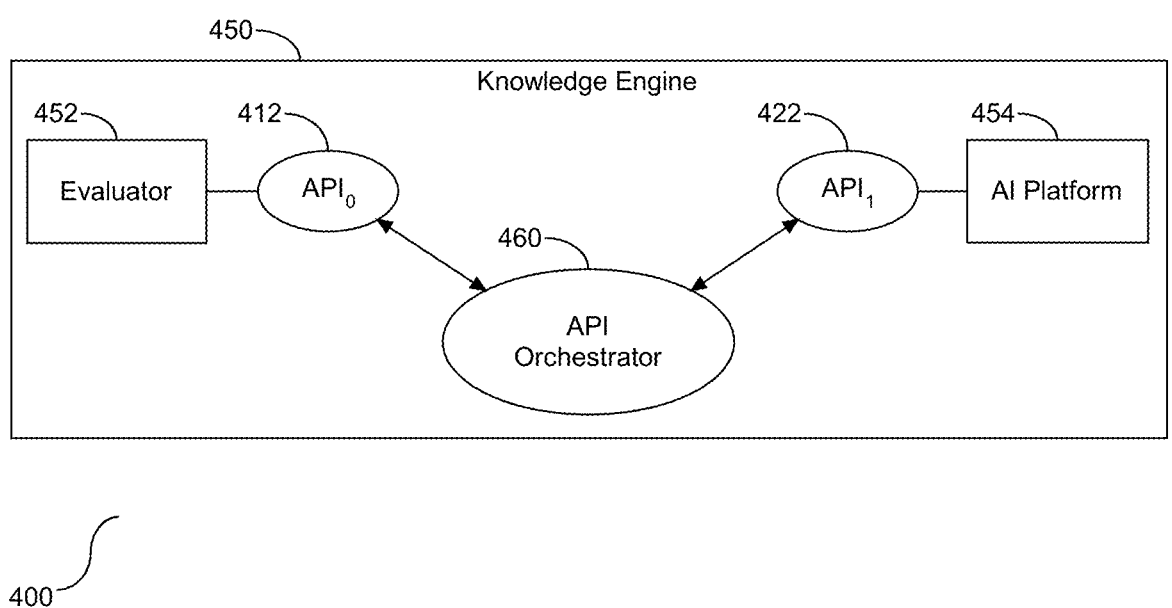
FIG. 4 depicts a block diagram illustrating the artificial intelligence platform tools, as shown and described in FIG. 2, and their associated application program interfaces.

An Application Program Interface (API) is understood in the art as a software intermediary between two or more applications. With respect to the knowledge engine (250) shown and described in FIG. 2, one or more APIs may be utilized to support one or more of the tools (252) and (254) and their associated functionality. Referring to FIG. 4, a block diagram (400) is provided illustrating the tools (252) and (254) and their associated APIs. As shown, the tools embedded within the knowledge engine (450) include the evaluator (252) shown herein as (452) associated with $API_0$ (412), and the AI platform (254) shown herein as (454) associated with $API_1$ (422). Each of the APIs may be implemented in one or more languages and interface specifications. $API_0$ (412) supports the functionality of the evaluator (452) and $API_1$ (422) provides functional support for the AI platform (454). As shown, each of the APIs (412) and (422) are operatively coupled to an API orchestrator (460), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 5:
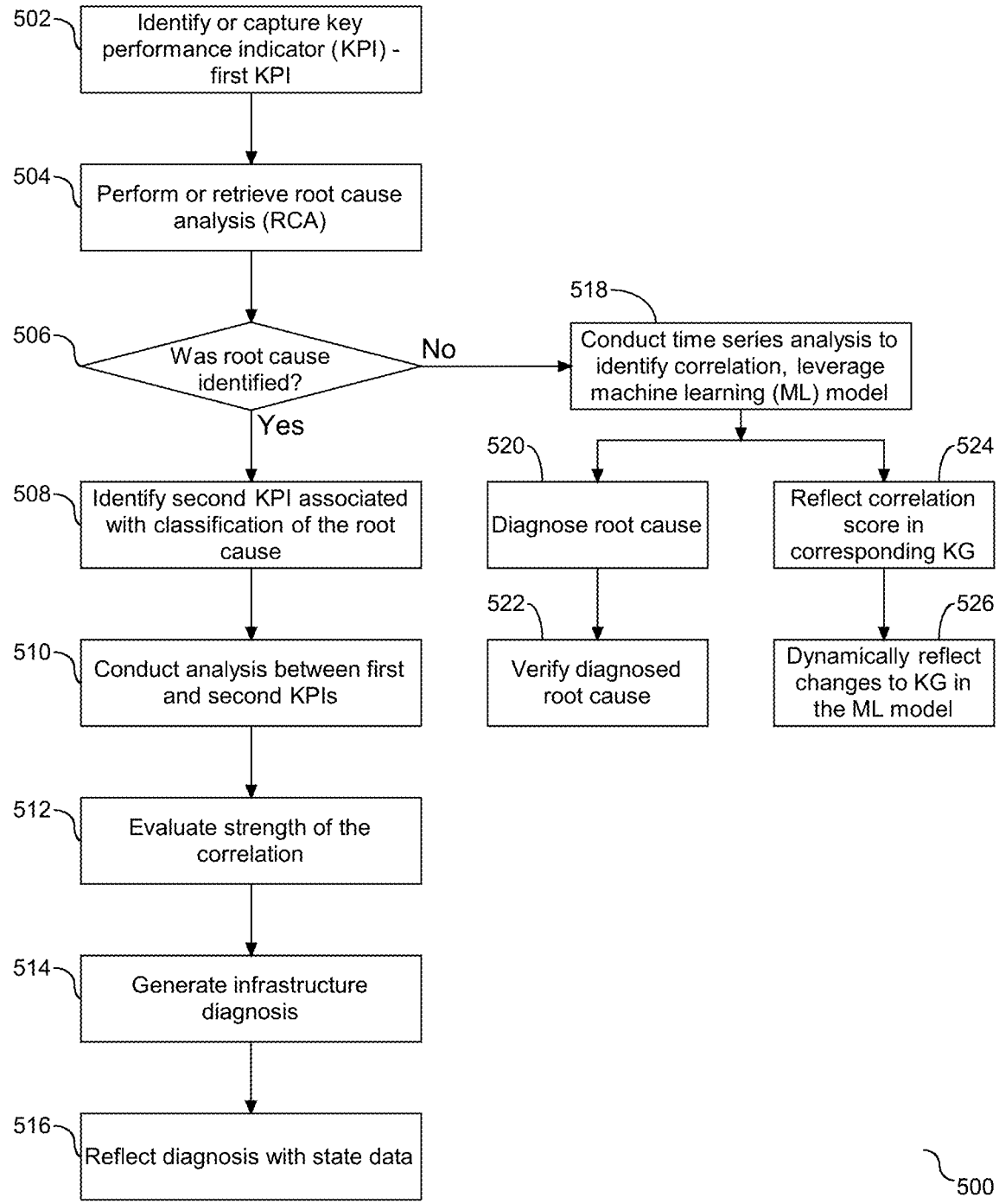
FIG. 5 depicts a flow chart illustrating a process for infrastructure maintenance.

Referring to FIG. 5, a flow chart (500) is provided illustrating a process for infrastructure maintenance. As shown, a KPI is identified or otherwise captured (502), e.g. first KPI. A RCA associated with the KPI is performed (504), or in one embodiment a KG from a previously conducted RCA is leveraged. As shown and demonstrated in FIG. 3, the RCA creates a graph with nodes and edges, with the root being the classification corresponding to the identified or captured KPI. An example graph with nodes and edges is shown and described in FIG. 3. It is then determined if a root cause is found or otherwise identified in the RCA (506). A positive response to the determination at step (506) is followed by identifying a second KPI associated with the classification of the root cause (508). Thereafter, an analysis is conducted between the first KPI and the second KPI (510), with the analysis producing a correlation between the KPIs. As shown and described in FIG. 3, a KG may be constructed representing the first and second KPIs as nodes, and a connecting edge as the correlation. The correlation may be strong, weak, or intermediate. The correlation is further analyzed to assess and evaluate its strength (512). In one embodiment, the strength evaluation includes a statistical evaluation of the first and second KPIs. A diagnosis of the infrastructure as directed to at least the first KPI, and depending on the strength of the correlation to the second KPI, is generated (514). In the case of a strong correlation, the diagnosis includes the root cause identified at step (506), which is reflected with actual state data (516).

A negative response to the determination at step (506) is an indication that the root cause of the first KPI is not apparent from the initial RCA performed at step (504). Following the negative response to the determination at step (506), a time series analysis is conducted to identify the correlation between the KPIs (518). The time series analysis is shown and described in FIG. 2 in relation to the AI platform (254). A ML model is leveraged at step (518) to compute a correlation score from a series of KPIs over time, and to diagnose the root cause of an underlying and identified error or concern in the infrastructure (520). The diagnosed root cause is presented for verification (522). In addition, the correlation score computed at step (518) is reflected in the corresponding KG (524) with the strength, or in one embodiment the weakness, of the edge(s) reflected in the graph. Any changes to the KG are similarly and dynamically reflected in the ML model (526) leveraged at step (518). Accordingly, the evaluation of the performance indicators and corresponding RCA may involve a time series analysis to identify a root cause and corresponding correlation.

As shown and described in FIGS. 2 and 5, the AI platform (254) may analyze time series data to identify the root cause and corresponding performance indicators. The following is pseudo code demonstrating a process to identify a correlated performance indicator using operational metrics:

```
Input: low-maturity scored KPI k_0, all other KPIs for the account k_1, k_2, . . . k_n
for i = 0, 1, 2, . . . , n
    for j = i +1, i+2, . . ., n
        compute correlation score:
        corr (k_i, k_j) = r - square value (12- month KPI value for k_i, 12-month KPI value
        for k_j)
            define KPI distance:
                d (k_i, k_j) = 1 - corr (k_i, k_j)
            use unsupervised machine learning to find KPI that is close to k_0
Output: KPI that is close to k_0
```

Accordingly, as shown, the pseudo code is an example of implementing a time series analysis to support statistical correlation to identify a proximally correlated performance indicator.

The process shown and described in FIG. 5 is directed at infrastructure management to maintain the health and integrity of the infrastructure. As shown, a statistical correlation between performance indicators is used in conjunction with the RCA to identify one or more technical health issues directed at previously hidden or unknown aspects of the infrastructure.

Embodiments shown and described herein may be in the form of a computer system for use with an intelligent computer platform for providing dynamic infrastructure management. Aspects of the evaluator (252) and AI platform (254) and their associated functionality may be embodied in a computer system/server in a single location, or in one embodiment, may be configured in a cloud based system sharing computing resources. With references to FIG. 6, a block diagram (600) is provided illustrating an example of a computer system/server (602), hereinafter referred to as a host (602) in communication with a cloud based support system, to implement the system and processes described above with respect to FIGS. 1-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The host (602) may be described in the general context of computer system-executable instructions, such as program modules, being executed by a computer system. Generally, program modules may include routines, programs, objects, components, logic, data structures, and so on that perform particular tasks or implement particular abstract data types. The host (602) may be practiced in distributed cloud computing environments where tasks are performed by remote processing devices that are linked through a communications network. In a distributed cloud computing environment, program modules may be located in both local and remote computer system storage media including memory storage devices.

Figure 6:
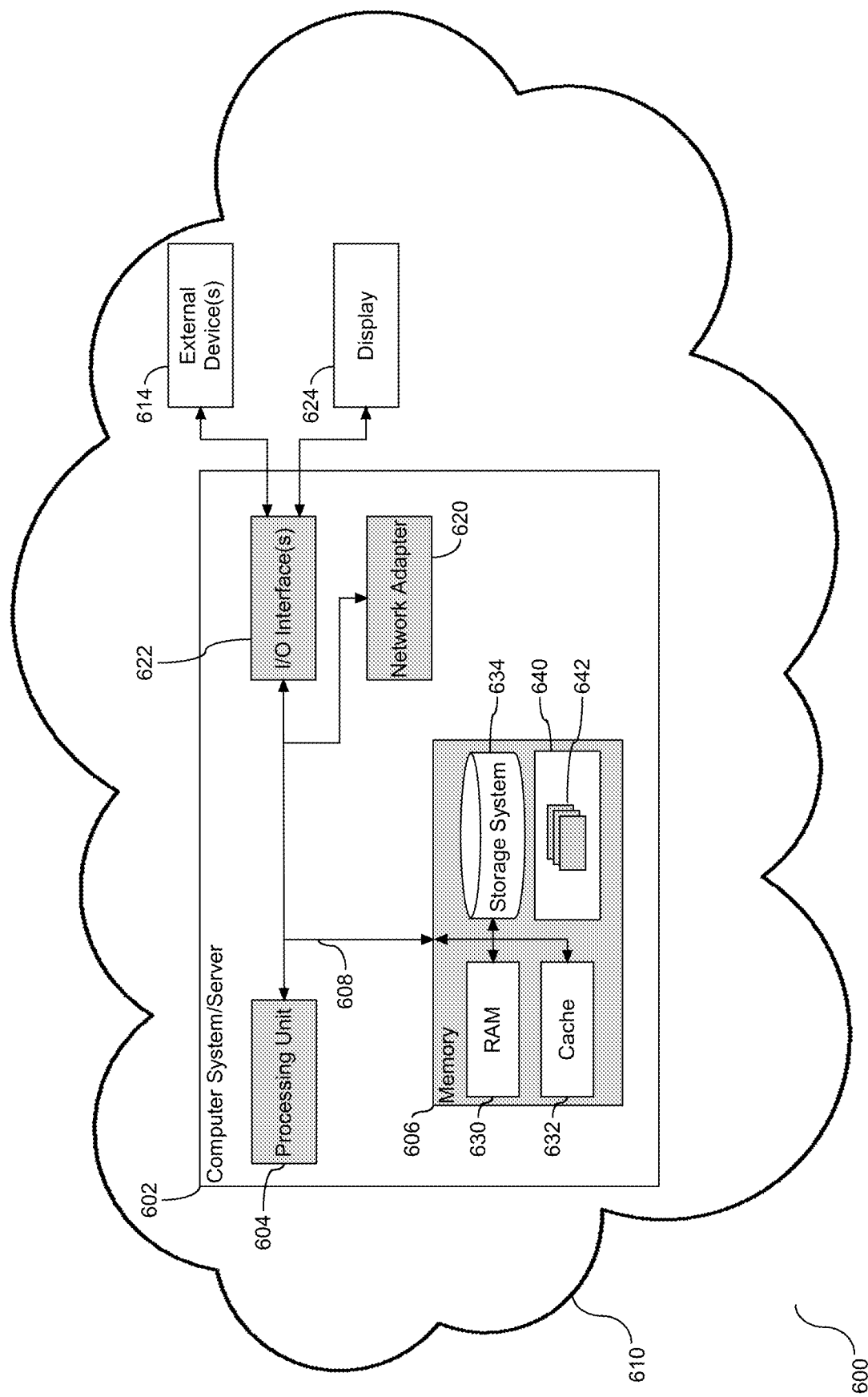
FIG. 6 depicts a block diagram illustrating an example of a computer system/server of a cloud based support system, to implement the system and processes described above with respect to FIGS. 1-5.

As shown in FIG. 6, host (602) is shown in the form of a general-purpose computing device. The components of host (602) may include, but are not limited to, one or more processors or processing units (604), e.g. hardware processors, a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to dynamically communicate evaluation interrogatory identification and processing. For example, the set of program modules (642) may include the tools (252) and (254) as described in FIG. 2.

The host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, the host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
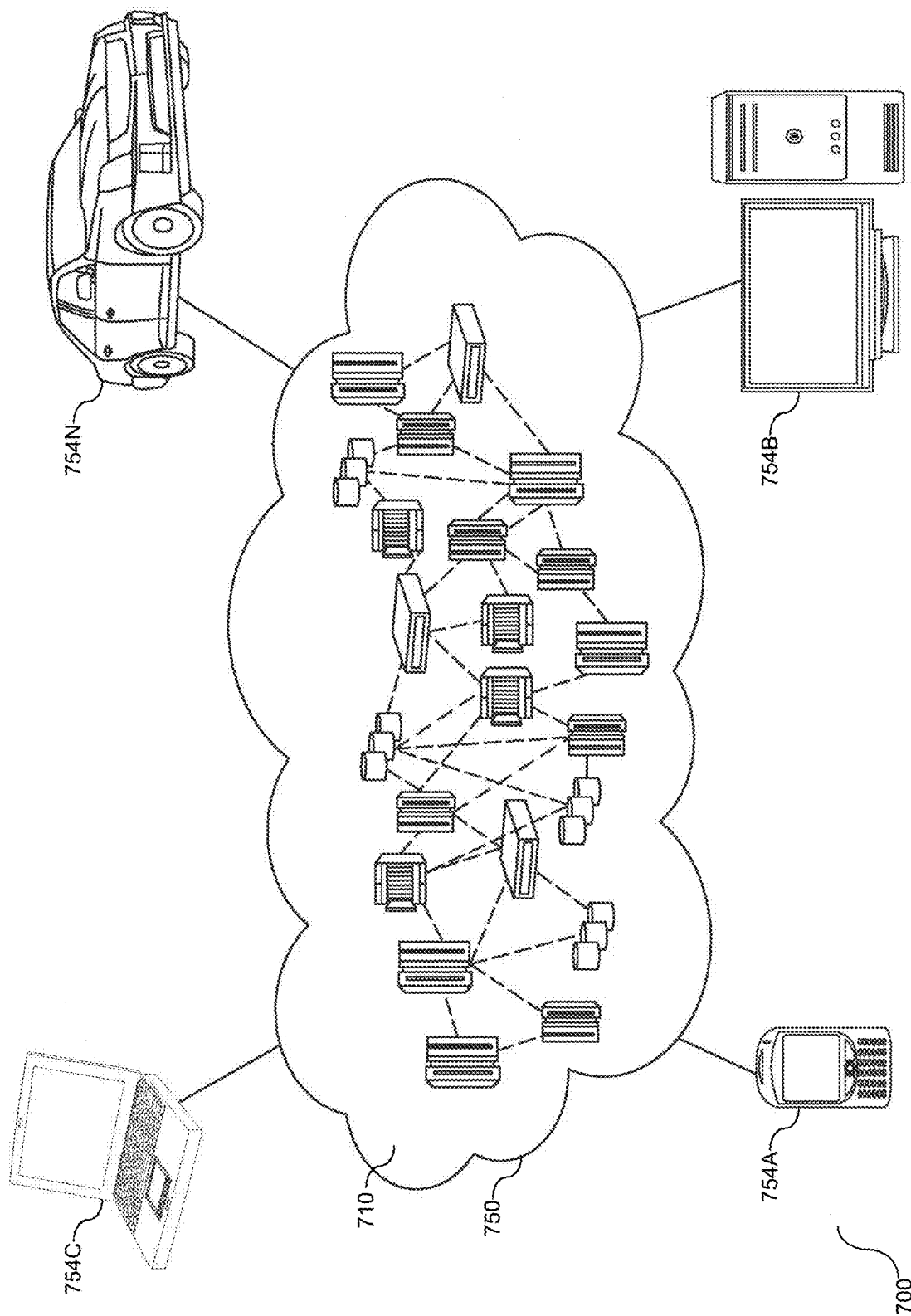
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
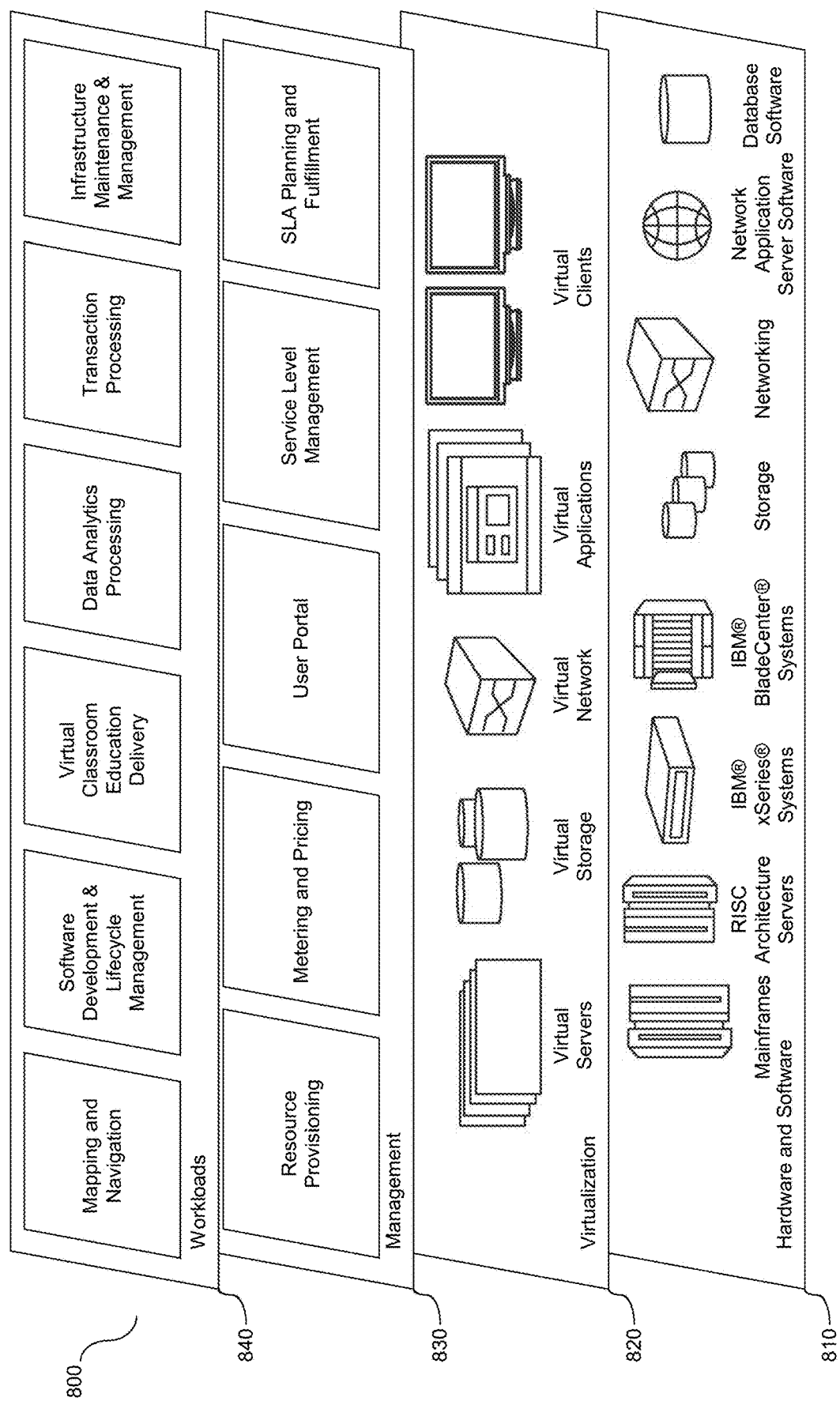
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and infrastructure maintenance and management.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to address infrastructure management, and more specifically RCA analysis and statistical correlation.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A system comprising:
    a processing unit operatively coupled to computer memory; and
    an evaluator for use in an information technology (IT) infrastructure having a plurality of physical hardware domains, each domain having key performance indicator (KPI) data, the evaluator operatively coupled to and executable by the processing unit to:
        dynamically monitor the physical hardware domains of the IT infrastructure, and reflect one or more changes of one or more of the physical hardware domains in one or more machine learning (ML) models;
        identify a first KPI related to a technical health issue of one or more of the dynamically monitored physical hardware domains, the first KPI quantifying a performance of a first IT component;
        perform a root cause analysis (RCA) for the identified first KPI, including to: identify a first KPI classification associated with the first KPI;
        access a knowledge graph (KG) from a knowledge base stored in the computer memory, the KG corresponding to the identified first KPI classification;
        leverage the KG to selectively identify the root cause corresponding to the first KPI;
        if the root cause is selectively identified, leverage the KG to identify a second KPI associated with classification of the selectively identified root cause of the first KPI classification, and evaluate a strength of a correlation between the first KPI and the second KPI, the second KPI quantifying a performance of a second IT component; and if the root cause is not selectively identified, leverage at least one of the one or more ML models using artificial intelligence (AI) to carry out a time series analysis of a series of KPIs over time to selectively identify at least one KPI that is proximally related to the first KPI, identify a classification of the proximally related KPI to diagnose the root cause of the first KPI, and provide a strength of the correlation between the first KPI and the proximally related KPI;

the at least one of the one or more ML models configured to dynamically amend the KG to reflect the diagnosed root cause, wherein a first node of the KG represents the first KPI classification, a second node of the KG represents either the second KPI classification or the proximally related KPI classification, and an edge connecting the first node and the second node represents the correlation;

generate a diagnosis of the technical health issue within the IT environment based on the strength of the correlation between the first KPI and either the second KPI or the proximally related KPI; and utilize the correlation to manage the physical infrastructure, including resolve the technical health issue.

2. The system of claim 1, wherein the evaluation of the strength of the correlation between the first KPI and the second KPI further comprises the evaluator configured to perform a statistical evaluation of the first and second KPIs, and wherein the dynamic amendment to the KG comprises the evaluator configured to reflect the strength of the correlation in the edge of the KG connecting the first and second nodes.

3. The system of claim 1, wherein the evaluator is further configured to construct a KPI correlation graph from the first KPI classification associated with the first KPI and a second KPI classification of the second KPI, the KPI correlation graph comprising at least two nodes respectively representing the first and second KPI classifications and a connecting edge representing the strength of the correlation.

4. The system of claim 1, wherein the evaluator is further configured to selectively verify the root cause, including reflect the root cause with actual state data.

5. The system of claim 1, further comprising the AI platform configured to classify at least a first ML model based on a first criteria and classify at least a second ML model based on a second criteria, and further configured to select one of the at least first and second ML models based on one of the first and second criteria.

6. The system of claim 5, wherein the first ML model and the second ML model are stored collectively.

7. The computer system of claim 1, further comprising the AI platform configured to establish a relationship between at least one of the one or more ML models and the KG, including store metadata of at least one of the one or more ML models with the KG, store metadata of the KG with at least one of the one or more ML models, or a combination thereof.

8. The computer system of claim 7, further comprising the AI platform configured to dynamically maintain the relationship between the KG and the one or more ML models, including leverage the stored metadata to identify the related KG and one or more ML models, and to dynamically reflect a change in the KG to the one or more ML models and dynamically reflect a change in the one or more ML models to the KG.

9. A computer program product to derive key performance indicators (KPIs), the computer program product comprising:

a computer readable storage medium having program code embodied therewith, the program code executable by a processor operatively coupled to computer memory to:

identify a first KPI related to a technical health issue of one or more dynamically monitored physical hardware domains, the first KPI quantifying a performance of a first information technology (IT) component;

perform a root cause analysis (RCA) for the identified first KPI, including to: identify a first KPI classification associated with the first KPI;

access a knowledge graph (KG) from a knowledge base stored in the computer memory, the KG corresponding to the identified first KPI classification;

leverage the KG to selectively identify the root cause corresponding to the first KPI;

if the root cause is selectively identified, leverage the KG to identify a second KPI associated with classification of the selectively identified root cause of the first KPI classification, and evaluate a strength of a correlation between the first KPI and the second KPI, the second KPI quantifying a performance of a second IT component; and if the root cause is not selectively identified, leverage at least one a machine learning (ML) model using artificial intelligence (AI) to carry out a time series analysis of a series of KPIs over time to selectively identify at least one KPI that is proximally related to the first KPI, identify a classification of the proximally related KPI to diagnose the root cause of the first KPI, and provide a strength of the correlation between the first KPI and the proximally related KPI;

the at least one ML model configured to dynamically amend the KG to reflect the diagnosed root cause, wherein a first node of the KG represents the first KPI classification, a second node of the KG represents either the second KPI classification or the proximally related KPI classification, and an edge connecting the first node and the second node represents the correlation; and generate a diagnosis of the technical health issue within the IT environment based on the strength of the correlation between the first KPI and either the second KPI or the proximally related KPI, and utilize the correlation to manage the one or more physical hardware domains, including resolve the technical health issue.

10. The computer program product of claim 9, wherein the program code to evaluate the strength of the correlation between the first KPI and the second KPI includes program code executable by the processor to perform a statistical evaluation of the first and second KPIs, and wherein the program code to dynamically amend the KG comprises program code to reflect the strength of the correlation in the edge of the KG connecting the first and second nodes.

11. The computer program product of claim 9, further comprising program code executable by the processor to construct a KPI correlation graph from the first KPI classification associated with the first KPI and a second KPI classification associated with the second KPI, the KPI correlation graph comprising at least two nodes respectively representing the first and second KPI classifications and a connecting edge representing the strength of the correlation.

12. The computer program product of claim 9, further comprising program code executable by the processor to train the at least one ML model to compute a correlation score from a series of KPI scores over time.

13. The computer program product of claim 9, further comprising program code executable by the processor to store the generated KG in a KG repository containing one or more stored KGs for subsequent dynamic amendment of the KG.

14. The computer program product of claim 9, further comprising program code executable by a processor to classify at least a first ML model based on a first criteria and classify at least a second ML model based on a second criteria, and further configured to select one of the at least first and second ML model based on one of the first and second criteria.

15. The computer program product of claim 9, further comprising program code executable by the processor to establish a relationship between the at least one ML model and the KG, including store metadata of at least one ML model with the KG, store metadata of the KG with at least one ML model, or a combination thereof.

16. The computer program product of claim 15, further comprising program code executable by the processor to dynamically maintain the relationship between the KG and the at least one ML model, including to dynamically reflect a change in the KG to the at least one ML model and dynamically reflect a change in the at least one ML model to the KG.

17. A computer-implemented method for use an information technology (IT) environment having a plurality of domains, each domain having key performance indicator (KPI) data, the method comprising:
dynamically monitoring the domains of the IT environment, and reflect one or more changes of one or more of the domains in one or more machine learning (ML) models;
identifying a first KPI related to a technical health issue of one or more of the dynamically monitored domains, the first KPI quantifying a performance of a first information technology (IT) component;
performing a root cause analysis (RCA) for the identified first KPI, including, using a processor operatively coupled to computer memory:
identifying a first KPI classification associated with the first KPI;
accessing a knowledge graph (KG) from a knowledge base stored in the computer memory, the KG corresponding to the identified first KPI classification;
leveraging the KG to selectively identify the root cause corresponding to the first KPI;
if the root cause is selectively identified, leveraging the KG to identify a second KPI associated with classification of the selectively identified root cause of the first KPI classification, and evaluate a strength of a correlation between the first KPI and the second KPI, the second KPI quantifying a performance of a second IT component; and
if the root cause is not selectively identified, leveraging at least one of the one or more ML models using artificial intelligence (AI) to carry out a time series analysis of a series of KPIs over time to selectively identify at least one KPI that is proximally related to the first KPI, identify a classification of the proximally related KPI to diagnose the root cause of the first KPI, and provide a strength of the correlation between the first KPI and the proximally related KPI;
dynamically amending the KG to reflect the diagnosed root cause, wherein a first node of the KG represents the first KPI classification, a second node of the KG represents either the second KPI classification or the proximally related KPI classification, and an edge connecting the first node and the second node represents the correlation; and
generating a diagnosis of the technical health issue within the IT environment based on the strength of the correlation between the first KPI and either the second KPI or the proximally related KPI, and utilizing the correlation to manage the IT environment, including resolving the technical health issue.

18. The computer-implemented method of claim 17, wherein evaluating the strength of the correlation between the first KPI and the second KPI includes performing a statistical evaluation of the first and second KPIs, and wherein the dynamically amending the KG comprises reflecting the strength of the correlation in the edge of the KG connecting the first and second nodes.

19. The computer-implemented method of claim 17, further comprising constructing a KPI correlation graph from the first KPI classification associated with the first KPI and a second KPI classification associated with the second KPI, the KPI correlation graph comprising at least two nodes respectively representing the first and second KPI classifications and a connecting edge representing the strength of the correlation.

20. The computer-implemented method of claim 17, further comprising selectively verifying the root cause, including reflecting the root cause with actual state data.

21. The computer-implemented method of claim 17, further comprising training the one or more ML models to compute a correlation score from a series of KPI scores over time.

22. The computer-implemented method of claim 17, further comprising: storing the generated KG in a KG repository containing one or more stored KGs for subsequent dynamic amendment of the KG.

23. The computer-implemented method of claim 17, further comprising classifying at least a first ML model based on a first criteria and classifying at least a second ML model based on a second criteria, and selecting one of the at least first and second ML model based on one of the first and second criteria.

24. The computer-implemented method of claim 17, further comprising establishing a relationship between at least one of the one or more ML models and the KG, including storing metadata of at least one of the one or more ML models with the KG, storing metadata of the KG with at least one of the one or more ML models, or a combination thereof.

25. The computer-implemented method of claim 24, further comprising dynamically maintaining a relationship between the KG and the one or more ML models, including dynamically reflecting a change in the KG to the one or more ML models and dynamically reflecting a change in the one or more ML models to the KG.

* * * * *